Nov. 4, 1969 E. F. SHIBER ET AL 3,476,885

INFORMATION COMPRESSION TRANSFERENCE MEANS

Filed June 8, 1967 2 Sheets-Sheet 1

INVENTORS
JEROME A. SHIBER
EVELYN F. SHIBER

BY Bernard M. Goldman
ATTORNEY

Nov. 4, 1969 E. F. SHIBER ET AL 3,476,885

INFORMATION COMPRESSION TRANSFERENCE MEANS

Filed June 8, 1967 2 Sheets-Sheet 2

1

3,476,885

INFORMATION COMPRESSION TRANSFERENCE MEANS

Evelyn F. Shiber and Jerome A. Shiber, Ridgefield Park, N.J., assignors to International Business Machines Corporation, Armonk, N.Y., a corporation of New York Filed June 8, 1967, Ser. No. 644,552
Int. Cl. G11b *5/00;* B65h *17/22*
U.S. Cl. 179—100.2 10 Claims

ABSTRACT OF THE DISCLOSURE

An apparatus for recurrently engaging and disengaging a speech recorded master magnetic tape with a slave magnetic tape. The master tape can be moved either continuously or discontinuously. The slave tape moves with the master tape when they are engaged. When not engaged, the master tape may continue to be moved without the slave tape being moved. A recording transference is caused from the master tape to the slave tape during engagement. The engagement and disengagement cycle can involve a predetermined duty cycle of time or distance. After disengagement, a small backspacing action may be provided to the slave tape.

Background of the invention

*Field of invention.*—This invention relates to an improved means for obtaining speech compression by chopping out periodic segments of the original speech and moving together the remaining segment so that they can be replayed in a shorter amount of time than the original. It has been found that legibility with speech can be obtained in some cases with a time compression of as much as one-sixth of the original time.

*Description of prior art.*—The prior art teaches rotating or moving head elements for periodically chopping out speech to obtain a time compressed recording. This invention avoids having any moving or rotating magnetic head elements.

Summary of the invention

This invention compresses information by controlling longitudinal and transverse relative motion between a recorded medium and a recordable medium to control a transference recording therebetween.

This invention provides a simpler device for obtaining speech compression than is known to exist in the prior art. The subject invention does not require any complicated mechanical arrangement for obtaining the speech chopping effect onto a recorded medium. The invention can reduce the basic mechanical motion involved to a simple rotation of a distorted roller. Other equivalent mechanisms within the invention are also simple in their form to obtain a usable compressed information representation. This invention uses a magnetic duplicating transference technique of the type explained in Patent 2,738,383 to Herr et al., and uses a speech compression technique similar to that disclosed in U.S.A. No. 2,886,-650 although the subject invention does not use the means required by the latter patent involving rotating heads.

The invention provides mechanical means for engaging and disengaging a master recorder medium with a slave recordable medium. A periodic predetermined duty cycle of time or distance can be used for the engagement and disengagement. The master medium can be moved either continuously or discontinuously. The slave medium moves only when it is engaged by the master recorded medium so that they move in synchronism during engagement. Recording transference is caused during engagement. In

2 general, speed variation or incremental start and stopping of the mediums does not affect the operation of this invention. An external flux bias means can provide a transference flux to the engaged surfaces to transfer the information from the master to the slave medium. Portions of the master medium moved without engaging the slave medium determine the amount of compression of the master record appearing on the slave medium.

Another feature of the invention is a backward movement control means which comprises a resilient means that is biased during each forward movement of the slave medium, so that when disengagement occurs the resilient means moves the slave medium backwardly slightly to eliminate any gapping effect which might otherwise exist on the slave medium. This also can minimize a type of distortion which can be caused by engagement and disengagement transients in some of the simpler embodiments of the invention.

Brief description of the drawings

The foregoing and other objects, features and advantages of the invention will be apparent from the following more particular description of preferred embodiments of the invention, as illustrated in the accompanying drawings.

Description of the preferred embodiments

Figure 1:
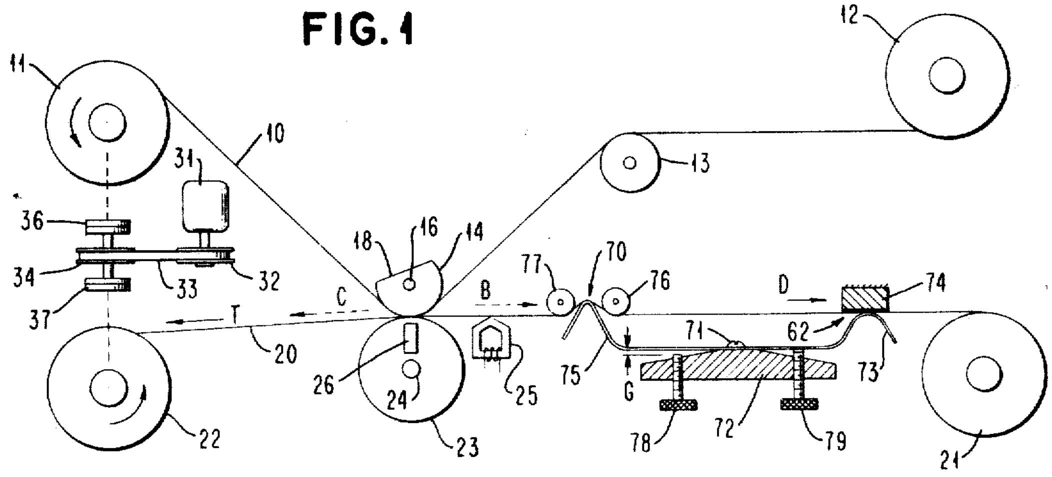
FIGURES 1, 2, 7, 8 and 9 illustrate different embodiments of the invention.

In FIGURE 1, a master tape 10 is received onto a take-up reel 11 from a supply reel 12. The path for tape 10 includes a circular roller 13 and a distorted roller 14. Take-up reel 11 is rotated by a conventional slip clutch 36 driven by a motor 31, which is connected through a belt 33 that wraps around pulleys 32 and 34.

Figure 7:
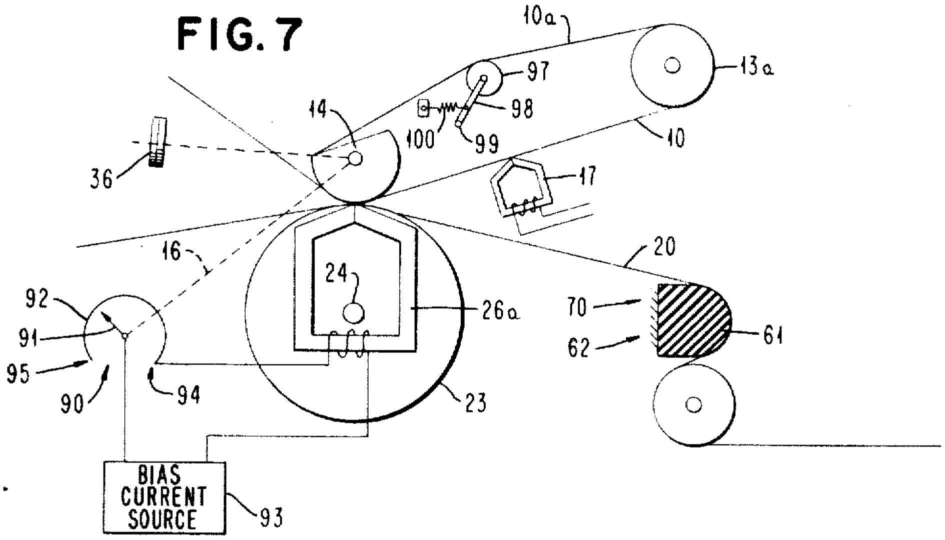

Master tape 10 is recorded prior to it reaching distorted roller 14. For example, tape 10 may have been recorded on any other tape recorder. On the other hand as shown in FIGURE 7, tape 10 might be recorded by a head 17 immediately prior to it reaching distorted roller 14.

As the recorded master tape 10 is received under distorted roller 14, periodic recorded lengths of master tape 10 are transferred to a slave tape 20. The periodic transferred pieces of information are placed next to each other on slave tape 20 without intervening gaps.

Slave tape 20 is moved to a take-up reel 22 from a supply reel 21. Reel 22 is driven by any means providing a minimal drive torque for reasons which will be explained later. In FIGURE 1 the driving means is via a slip clutch 37 which provides a minimal pull force T on tape 20. Clutch 37 may be driven also by motor 31 via the belt 33 and pulleys 32 and 34 that drive take-up reel 11.

The tape path for slave tape 20 from reel 22 also includes a tape drag means 62 (causing a drag force D) and a backward control means 70. The tape may also pass over an optional erase head 25 before reaching a hollow roller 23 supported rotatably at one end by a shaft 24. This roller may be omitted, if desired, tape bearing directly against bias means **26*a*. Erase means 25 may be any type of erase means, such as a permanent magnet or an AC or DC erase head. However, it preferably is an AC erase means in order to erase the tape to a zero magnetic flux state. A flux source is positioned within hollow roller 23 on the opposite side of tapes 10 and 20 from distorted roller 14. Source 26** may be any type of magnetic flux source capable of causing magnetic transference from a recorded magnetic surface to a non-sliding contacting magnetic surface. Magnetic copying by transference from a recorded surface onto a contacting unrecorded surface under actuation of a DC or AC bias field is taught in the prior art, for example by Herr Patent No. 2,738,383.

Distorted roller 14 has as its purpose the periodic transverse movement of master tape 10 into and out of engagement with slave tape 20, in order to obtain information transference and driving movement for slave tape 20 during engagement. No information transference and no movement of tape 20 should occur when it is out of engagement with master tape 10 which continues to move.

Tape drag is provided at or adjacent to the supply reel to create a required tension on the tape between the supply reel and take-up reel. Thus the invention comprehends any tape drag means which provides a drag D less than the maximum pull force T so that tape 20 cannot be moved by force T alone, for reasons to be explained later.

Backward movement control means 70 acts to move tape 20 back by a small amount, against pull force T, after disengagement of tape 20 by roller 14.

In more detail regarding FIGURE 1, the drag means 62 is provided by a frictional clamp comprising a U-shaped spring-biased metal member 73 engaging the back side of the tape and pushing it against a fixed felt-covered surface 74 that engages the magnetic surface of the tape. The U-shaped member 73 is formed at the end of a piece of spring metal fastened at its center to a metal block 72 fixed to the frame of the tape deck. The drag force D is adjustable by turning a thumb screw 79, which is threadedly supported through the right side of support 72. The end of thumb screw 79 engages spring 73 to move it in a direction toward pressure pad 74. When thumb screw 79 is entirely removed, the spring tension in drag means 73 moves it completely away from pressure pad 74.

Backward control means 70 in FIGURE 1 comprises a smooth U-shaped spring member 75 fastened to frame member 72 and is integrally made with member 73 from a single piece of spring metal. A pair of idler rollers 76 and 77 are positioned in the tape path on opposite sides of U-shaped member 75 to control the loop size. The length of the backward tape movement is controlled by the setting of the gap G between thumb screw 78 and spring member 75. Member 75 is normally biased upward to form the tape loop. When member 75 is pulled downward to the thumb screw limit, it causes a relatively weak backward tension B on the tape. Tension B is only slightly greater than its opposite pulling force T, so that member 75 returns to its original position on disengagement of tapes 10 and 20 by distorted roller 14.

Engagement of tapes 10 and 20 occurs while the maximum radius periphery of roller 14 is opposite flux source 26. Therefore, nonengagement of tapes 10 and 20 occurs when the smaller-radius periphery 18 of roller 14 is adjacent flux source 26. Accordingly the driving relationship for slave tape 20 begins when roller 14 pushes the magnetic surface of the master tape 10 into sufficient frictional engagement with the magnetic surface of slave tape 20, whereby the forward motion of tape 10 carries with it tape 20 without sliding therebetween. In this manner a forward force C is applied to tape 20 during frictional contact with moving tape 10. Force C is therefore added to the pull force T to overcome the frictional drag D on tape 10. The force relationship on that part of tape 20 adjacent to flux source 26 can be definitively described in relation to the tape engagement and disengagement during rotation of distorted roller 14, as follows:

T is the pulling force on the slave tape from its take-up reel.

C is the pulling force on the slave tape transmitted from the master tape during roller engagement.

D is the total drag force on the slave tape.

B is the spring-back force on the slave tape due to the backward movement control means. It is energized mainly by C force and is greater than T.

While the slave tape is stopped during disengagement:

$$B=0$$
$$T<D \qquad (1)$$

When the slave tape starts to move forward upon initial engagement and before energizing the backward means:

$$B=0$$
$$C+T>D \qquad (2)$$

While the slave tape is moving forward, after energizing the backward means:

$$T<B>0 \qquad (3)$$
$$C+T>B+D \qquad (4)$$

Immediately following disengagement of the slave tape, backward motion is caused by:

$$T<B+D$$

since $$T<D \text{ and } B>T$$

It is therefore understood that as the master tape 10 is continuously moved forward, it rotates distorted roller 14 to cause master tape 10 to come into and out of driving engagement with slave tape 20, wherein continuous engagement occurs for a fixed distance M dependent upon the continuous length of the circular segment, represented as M in FIGURE 2A. Further, tapes 10 and 20 are disengaged while roller 14 rotates through the noncircular segment N having a radius less than the radius for segment M. During disengagement, roller 14 continues to be rotated by the forward movement of master tape 10. However slave tape 20 remains stationary during non-engagement, because it is not in driving engagement with master tape 10 and the pull force T of take-up reel 22 is insufficient to overcome the frictional drag force D existing upon tape 10.

Figures 3, 4:
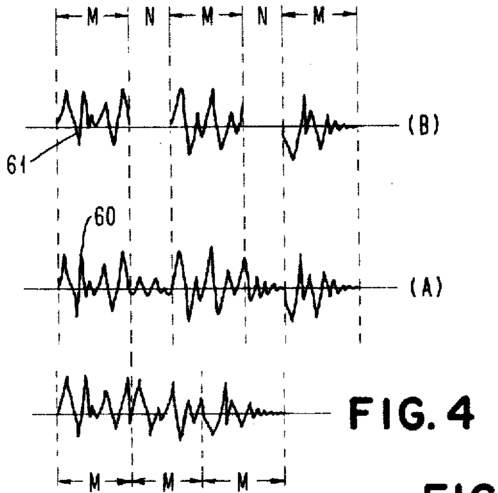
FIGURES 3, 4, 5 and 6 show waveforms used in explaining the operation and characteristics of the invention.

FIGURE 3A illustrates a speech waveform which might be recorded on master tape 10. FIGURE 3B shows the portions M of the wave on master tape 10 which are transferred to slave tape 20, while leaving out the portions N which are not transferred. FIGURE 4 shows the resultant recording on slave tape 20 of having the transferred lengths M sequentially positioned without any gaps therebetween, wherein it is seen in FIGURE 4 that the non-transferred distances N on the master tape 10 are squeezed out of the recording appearing on slave tape 20.

Figure 2:
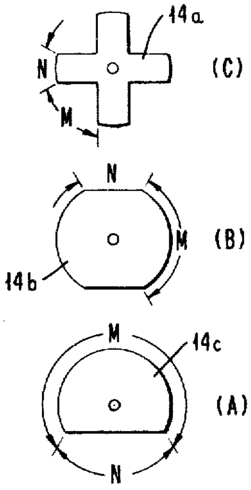

The length of each transferred portion M and untransferred portion N of the master tape can be controlled by the design of distorted roller 14. FIGURE 2 shows several different designs of distorted rollers 14 wherein FIGURE 2A represents the design used in FIGURE 1 which comprises a circular cam which may be made of metal or hard material and is circular for sector M and is chorded for sector N. In FIGURE 2A the length of each engaging tape portion M will depend on the length of roller sector M. Hence the length of the disengaged portion N in FIGURE 2A varies inversely from sector M. FIGURE 2B shows a design for roller 14 which obtains two engaged portions M per rotation cycle. FIGURE 2C shows a design for roller 14 having four engagement sectors M during one cam rotation cycle, each having about one-fourth the length of sector M in FIGURE 2A.

The principles used in the designs of the distorted rollers in FIGURES 2A, B and C thus can be understood in relation to obtain any transference length M and any chop out non-transferred length N desired on slave tape 20.

The explanation of the operation of the invention has thus far ignored any side effects which might cause distortion of the signal during the transference of recorded portions M to slave tape 20. The following explains certain distortion aspects and explains how they may be minimized or eliminated. One side effect may be caused by the master tape moving into engagement or out of engagement with slave tape 20 at the beginning and end of each transference length M. That is, a distorted magnetic transference may occur before or after frictional driving engagement whenever a sliding relationship exists between the tapes while they are in formation transference proximity. A distorted transference may result during these transient conditions of movement, unless certain further features are added, which are explained later.

Figure 5:
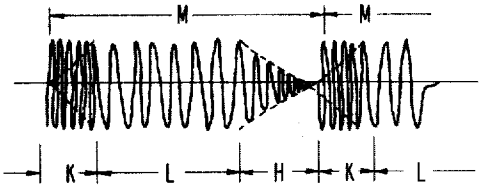

The waveform in FIGURE 5 represents the possible distortions that can occur in the engagement and disengagement transference to slave tape 20. For the purposes of FIGURE 5, a single wave-length sine wave of fixed amplitude is assumed to be recorded on master tape 10. Thus as the forward moving master tape 10 is transversely moved by roller 14 toward engagement with slave tape 20, the recorded flux of tape 10 will gradually come within transference range of slave tape 20 before slave tape 20 can begin movement due to frictional engagement with tape 10. This tape-to-tape slippage within transference range may even continue for a short distance after contact occurs, until the frictional contact accelerates the slave tape to the forward velocity of master tape 10. The engagement distortion region is represented in FIGURE 5 by length K, wherein a smeared plurality of transfer images occur at the initial portion of the transference. At the end of the acceleration portion K, nondistorted transference exists for a length L. At the end of length L, disengagement occurs. After disengagement, the momentum of slave tape 20 may continue movement for a slight distance as the master tape is moving out of transference range. During this deceleration a distorted recording length H may occur, and slave tape 20 comes to a stop at the end of length H.

FIGURE 5 ignores the effect of backward movement means 70. The next recording cycle M thereafter begins with an engagement-distortion region K immediately following the disengagement-distortion region H of the last transference engagement M. Accordingly there results, in this case, a total distortion length, H+K between undistorted lengths L.

Figure 6:
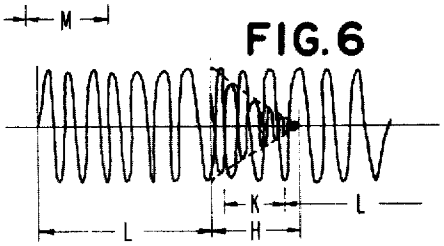

FIGURE 6 illustrates how this total distortion length can be minimized by proper operation of backward movement control means 70 to cause total overlap of the smaller of the two lengths K or H with the larger of the two, so that the total distorted length is the greater of K or H. Thus during the forward movement, the backward movement control spring 75 is biased downwardly against the stop of thumb screw 78 by the combined pulling forces T and C on the left side of the loop and the drag tension D on the right side of the loop. Upon disengagement, the pulling force C ceases on the left, and the force T is insufficient to hold loop 70 at its previous shortened length, so that loop 70 lengthens under its spring tension until it reaches its static longer length. This lengthening of loop 70 causes the slight backward movement of slave tape 20 under roller 14 and against the pull force T.

Thumb screw 78 hence can be adjusted to obtain precisely the overlap of the smaller distortion length K or H in relation to the longer distortion length of the two.

The distortion regions K and H can be still further minimized, or even totally eliminated, by controlling the switching of the transference flux of source 26 in relation to the contacting surfaces of tapes 10 and 20. One technique is to make distorted roller 4 from a highly permeable material, such as iron or steel, and thinly coat it with a nonpermeable friction substance in the manner taught in Patent No. 3,171,520 to R. Haines. In this cas the bias field is modulated by variation in the spacing between the biasing means 26 and roller 14. This field is maximum during tape engagement and its intensity decreases more rapidly with increase in distance after disengagement than would occur if roller 14 were made entirely of nonpermeable material.

A means that is totally effective for eliminating the distortion regions as shown in FIGURE 7 by providing a rotary switch 90 with its rotor 91 fixed to roller 14 by shaft 16. The switch has a stator 92 which is formed about an angle M equal to or slightly less than the angle of length M on the connected roller 14. Stator 92 is fixed to the tape deck with an angular position wherein rotor 91 leaves the stator end 94 at or just before tape disengagement and contacts the other stator end 95 at or just after engagement of tapes 10 and 20. Switch 90 is connected to a high-frequency bias current source 93 and to the transference flux source 26*a* so that the transference field is interrupted during the lengths K and H as well as the total tape nonengagement period, so that there is information transference only during the nonslippage engagements L in FIGURE 5. In this case length L is equal to length M in FIGURE 4. Backward movement control means 70 is adjusted so that each transference length L begins precisely at the end of the last transference length L. In this case a nondistorted waveform of the type shown in FIGURE 4 is obtainable.

FIGURE 7 shows a somewhat different drag means 62 and backward movement control means 70. They are both represented by a piece of resilient rubber 61 fixed to the frame of the tape deck. Rubber piece 61 has a round surface engaging the back side of the tape.

The master tape 10 in FIGURE 7 is an endless belt 10*a* rotated around rollers 13*a* and 14. Tension is maintained on belt 10*a* during its distorted engagement with roller 14 by means of a buffer arm 98 having a wheel 97 biased against tape 10*a* by a spring 100 fastened between the arm 98 and the tape deck. Either roller 13*a* or 14 may be driven, although distorted roller 14 is shown in FIGURE 7 as driven by means of slip clutch 36. An erase/write head 17 records the speech information on tape 10*a* before it reaches distorted roller 14.

Figure 8:
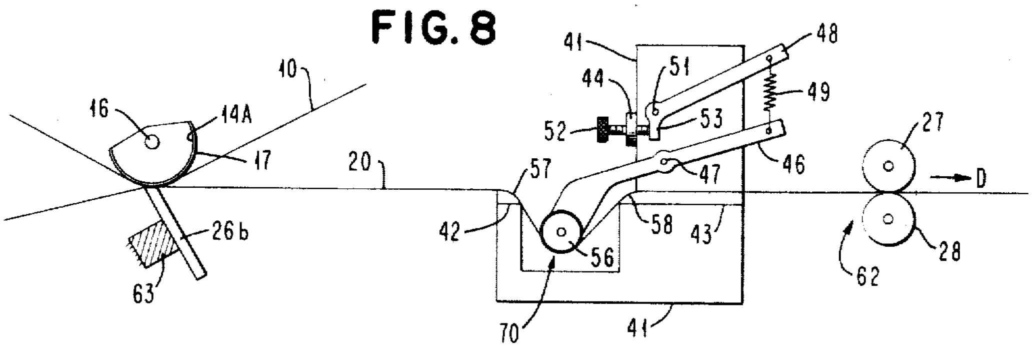

FIGURE 8 illustrates another embodiment wherein a flux transfer source 26B is a narrow resilient leaf with bias means such as a permanent magnet fixed by support 63 at its center portion to the tape deck. The backward movement control means 70 in FIGURE 8 includes a spring tension control design which comprises a bracket 41 fastened to the tap deck and has extensions 42 and 43 which are rounded adjacent to the tape loop beneath a roller 56 supported at the end of a pawl 46 pivoted about a shaft 47. The opposite end of pawl 46 is connected to a spring 49, which has its other end connected to a lever 48 that pivots about a shaft 51. The position of lever 48 is controlled by adjustment of a thumb screw 52 against an extension 53 of lever 48. Screw 52 is supported threadedly through an extension 44 of bracket 41. Accordingly thumb screw 52 can adjust the spring tension on tape loop 70 to control its amount of movement.

The drag means 62 in FIGURE 8 comprises a pair of rollers 27 and 28 which may be of conventional drag means design.

Figure 9:
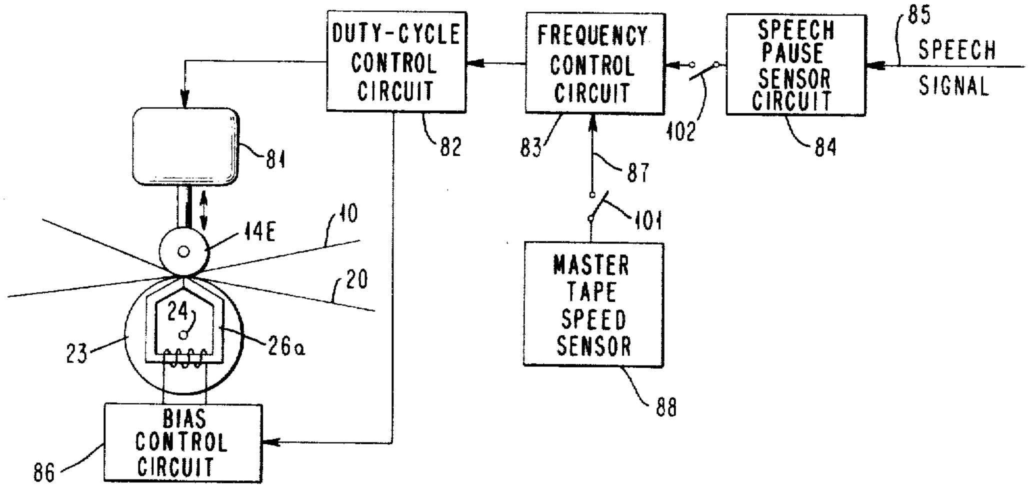

FIGURE 9 illustrates a further embodiment of the invention wherein tapes 10 and 20 are engaged and disengaged by a solenoid actuated roller 14E. The solenoid is controlled by the current output of a duty-cycle control circuit 82 which also provides an output to a bias control circuit 86 which (like in FIGURE 7) switches off the bias current to transfer flux source head 26A during the nonengagement period and during the initial and final slippage engagement periods H and K described above. Circuit 82, for example, may be comprised of two single-shot circuits which provide the two outputs and are triggered by the same input from a frequency control circuit 83. Thus solenoid 81 may be triggered for a period M while a bias control circuit 86 may be triggered for an inclusive period L. In this case M and L are time functions which are similar to the distance functions M and L defined in relation to the previously described embodiment. This distinction can be reconciled either (1) by maintaining a constant velocity for master tape 10, or (2) by controlling the frequency of circuit 83 by a master tape speed sensor 88, wherein the frequency of circuit 83 is synchronized with the speed of master tape 10.

Also is desired, a speech pause sensor circuit 84 is provided for disabling the frequency control circuit 83 whenever a pause is sensed in a speech input signal on an input lead 85 provided from a read head sensing the master tape 10 close to the transference region such as by placing head 17 also adjacent to roller 14 and connecting the signal to head 17 to lead 85. A distinction between FIGURE 9 and the prior embodiments is that the transference lengths M will be a function of time in FIGURE 9 rather than a function of distance such as in FIGURES 1, 7 and 8.

Switches 101 and 102 are representatively provided to show the optional nature of circuit 84 and/or 88, since either or both thereby can be switched out. When sensor 88 is not used, a constant frequency source, such as an oscillator or free-running multivibrator may comprise the frequency control circuit 83.

While the invention has been particularly shown and described with reference to preferred embodiments thereof, it will be understood by those skilled in the art that the foregoing and other changes in form and details may be made therein without departing from the spirit and scope of the invention.

We claim:

1. Means for compressing information by proximity transference from a first recorded medium onto a second medium comprising, means for automatically intermittently engaging the first medium and the second medium with each other within a recorded information area on said first medium and for simultaneously moving the media when they are in engagement.

means for transferring the information on said first medium to said second medium while they are in engagement, means for automatically non-linearly moving said first medium relative to said second medium when they are out of engagement within the recorded information area, whereby information recorded on said first medium can be recorded in a substantially recognizable manner in a reduced space upon said second medium.

2. Means as defined in claim 1 further comprising, means for providing backward movement for said second medium after a preceding forward movement, said backward movement being less than said forward movement.

3. Means as defined in claim 2 in which, said backward movement means comprises, resilient means for receiving portions of said second medium prior to its engagement with said first medium, and drag means operating on said second medium prior to said portions being received by said resilient means.

4. Speech compression means as defined in claim 1 in which said means for automatically non-linearly moving the first medium in relation to the second medium comprises, a distorted roller device.

5. Speech compression means as defined in claim 1 in which said means for automatically intermittently engaging the first medium and the second medium comprises, a mechanically contacting surface moved by an electrically energized device.

6. Speech compression means as defined in claim 1 in which said means for transferring the information comprises, a flux bias means.

7. Speech compression means as defined in claim 1 in which said means for transferring the information comprises, a permanent magnet.

8. Speech compression means as defined in claim 1 in which, said first medium and said second medium have magnetic surfaces, said means for non-linearly moving is located on the opposite side of said first medium from said second medium, the physical engagement of said first medium with said second medium being the driving means for said second medium, said means for transferring the information while said magnetic surfaces are in physical engagement comprising magnetic flux means, and said magnetic flux means providing flux to the magnetic surfaces while in engagement.

9. Means for compressing speech using proximity transference from a first magnetically recorded medium onto a second magnetically recordable medium comprising, means for regularly and automatically moving the first medium into and out of proximity magnetic transference with said second medium within a recorded information area on said first medium and for simultaneously moving the media when they are in engagement.

means for moving said first medium in a direction transverse to the direction of said regularly moving means, said second medium being automatically non-linearly moved with said first medium while out of proximity magnetic transference within the recorded information area.

10. Means for compressing speech comprising, a capstan having circular and non-circular surfaces for automatically receiving and non-linearly driving a first elongated medium in a longitudinal direction, said capstan driving said first medium in and out of engagement with a second elongated medium within a recorded information area on said first medium, said second medium being driven in a longitudinal direction when in engagement with said second medium, and means for causing transference of the recorded information from said first medium to said second medium only when in engagement.

References Cited

UNITED STATES PATENTS

| | | | |
|---|---|---|---|
| 1,790,559 | 1/1931 | Swift | 226—153 |
| 2,004,129 | 6/1935 | Potdevin | 226—153 |
| 2,738,383 | 3/1956 | Herr et al. | 179—100.2 |
| 2,747,026 | 5/1956 | Camras | 179—100.2 |
| 2,965,723 | 12/1960 | Hoshino et al. | 179—100.2 |
| 3,037,090 | 5/1962 | Bouzemburg | 179—100.2 |
| 3,161,120 | 12/1964 | Timares et al. | 226—97 |
| 3,315,242 | 4/1967 | Haddad | 179—100.2 |
| 3,318,501 | 5/1967 | Pleininger | 226—153 |
| 3,341,854 | 9/1967 | Supernowicz | 179—100.2 |

STANLEY M. URYNOWICZ, Jr., Primary Examiner

J. P. MULLINS, Assistant Examiner

U.S. Cl. X.R.

226—153

PO-1050
(5/69)

UNITED STATES PATENT OFFICE
CERTIFICATE OF CORRECTION

Patent No. 3,476,885 Dated November 14 1969

Inventor(s) E. F. Shiber, etal

It is certified that error appears in the above-identified patent and that said Letters Patent are hereby corrected as shown below:

Column 1, line 32, the word "segment" should read -- segments -- line 65, the word "recorder" should be -- recorded --. Column 5, line 64 "4" should be -- 14 --; and line 67, the word "cas" should be -- case --. Column 8, line 47, the word "second" should be -- first --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,476,885 Dated November 4, 1969

Inventor(s) E. F. Shiber, etal

It is certified that error appears in the above-identified patent and that said Letters Patent are hereby corrected as shown below:

Column 1, line 5, "N. J., assignors to International Business Machines Cor-" should read -- N. J., the latter assigning his entire interest to International Business Machines Cor- --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents 623-2721-0